United States Patent
Gersch

[15] 3,654,826
[45] Apr. 11, 1972

[54] ADJUSTABLE TOOL BLOCK ASSEMBLY

[72] Inventor: Richard C. Gersch, 27401 Red Leaf Lane, Southfield, Mich. 48075

[22] Filed: May 9, 1969

[21] Appl. No.: 823,343

[52] U.S. Cl. .................................................. 82/1.2, 408/151
[51] Int. Cl. .......................................................... B23b 39/00
[58] Field of Search ...................... 77/3, 58.34; 82/24 A, 1.2; 408/151

[56] References Cited

UNITED STATES PATENTS

| | | | |
|---|---|---|---|
| 2,833,169 | 6/1958 | Briney, Jr. et al. | 77/58.34 UX |
| 3,125,903 | 3/1964 | Briney, Jr. et al. | 77/58.34 UX |

FOREIGN PATENTS OR APPLICATIONS

| | | | |
|---|---|---|---|
| 1,022,345 | 3/1966 | Great Britain | 82/24 A |

Primary Examiner—Andrew R. Juhasz
Assistant Examiner—Leon Gilden
Attorney—Hauke, Gifford and Patalidis

[57] ABSTRACT

A tool block for a boring, turning, facing machine or the like in which a boring bar is adjustably supported within a housing of the block for axial and radial adjustment relative to the work surface. The boring bar is supported for axially sliding movement and is supported for radial movement within an eccentric rotatable sleeve surrounding the axial support, which is actuated for adjustment of retraction of the cutting tool from the workpiece by a reversible motor operating a gear arrangement to rotate the eccentric sleeve. When the eccentric sleeve is rotated in one direction, the cutting tool is adjusted relative to the work in response to wear of the tool and, if rotated in the other direction, the tool is retracted from the work surface.

7 Claims, 5 Drawing Figures

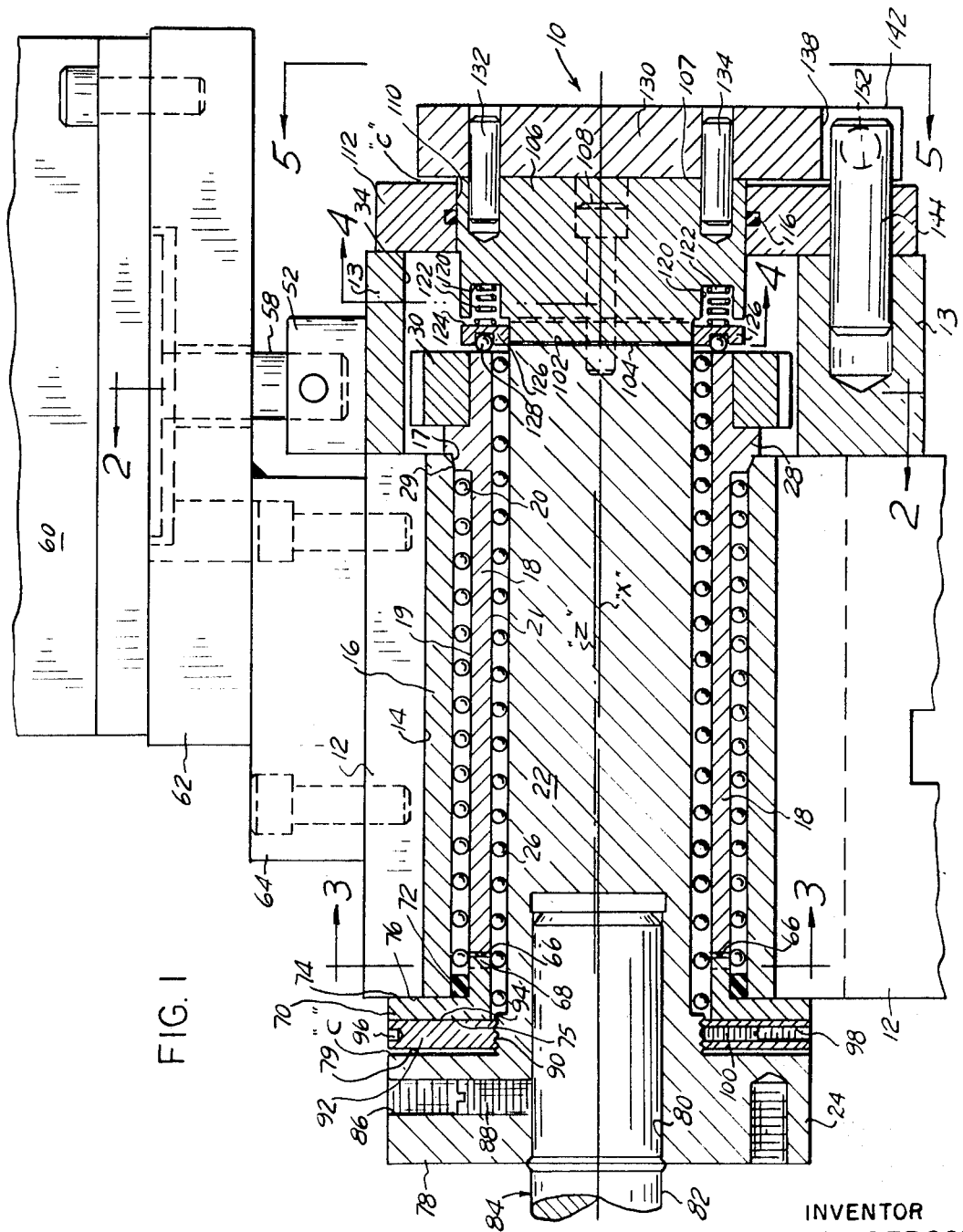
FIG. I
INVENTOR
RICHARD C. GERSCH
BY 
ATTORNEYS

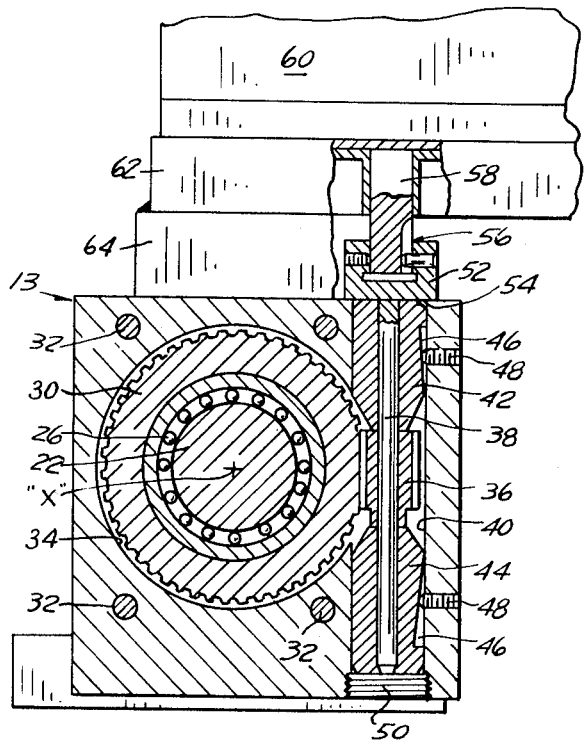
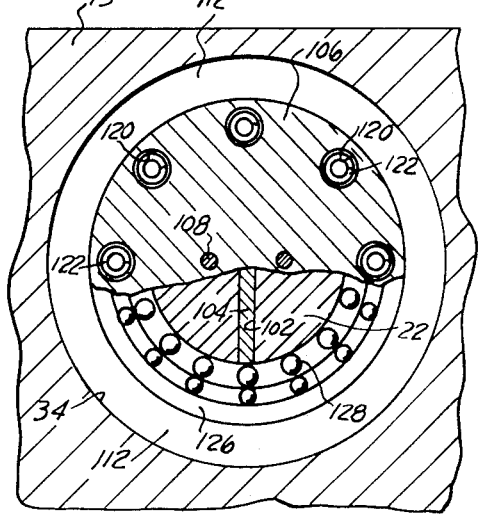
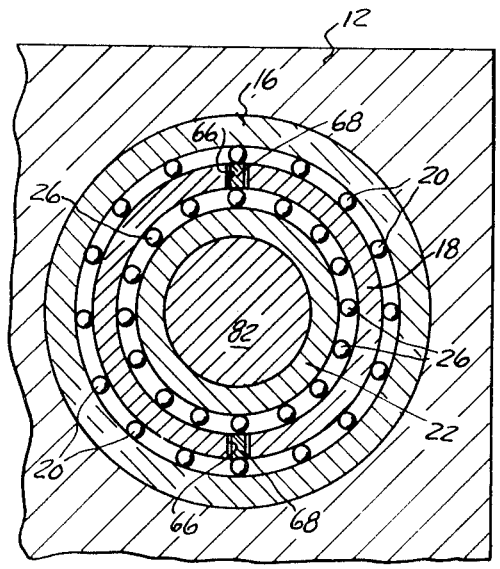
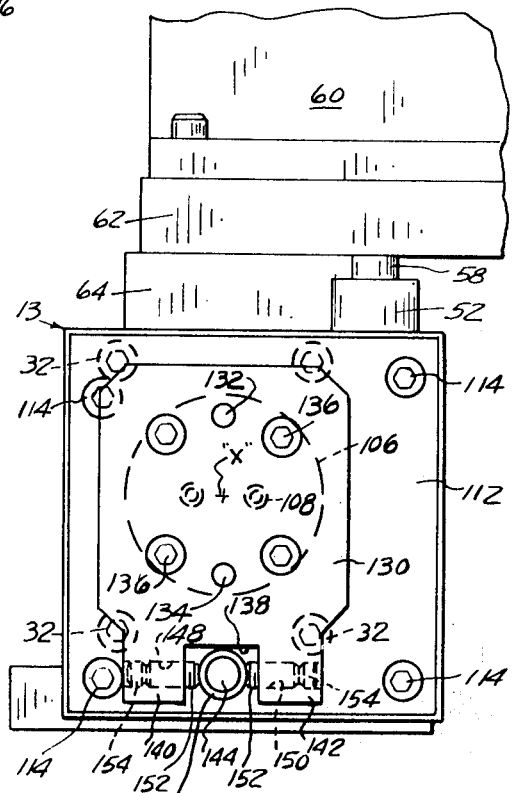

ADJUSTABLE TOOL BLOCK ASSEMBLY

BACKGROUND OF THE INVENTION

1. Field of the Invention

The invention pertains in general to precision adjusting tools and more in particular to an adjustable boring bar in a tool block assembly.

2. Description of the Prior Art

Tool block assemblies, especially boring bar tool block assemblies, which provide adjustment for wear by pivoting the boring bar around an eccentric axis are known in the art. Others are known which are operable to retract the cutting tool of the boring bar from the cutting surface to permit repositioning of the work or replacement of the tool. Obviously, if the boring tool is not removed from the work surface upon such repositioning, undesirable scratch marks will be made on the work surface or the cutting tool may be damaged inadvertently.

Prior to the present invention, to perform repositioning of the work or tool the machine operation had to be shut down to make the readjustment with an inherent loss of manhours and excessive downtime.

Boring tool block assemblies are known which automatically and continuously adjust the boring bar to the work surface, as for instance, at the rear of the cutting tool and for axial adjustment of the cutting tool. However, these adjustments or retractions of the cutting tool have been made either manually, which is unreliable, or by means of pressure devices such as fluid cylinders. The latter devices are likewise inadequate in that they provide a stroke in one direction only and only upon occurrence of cutting tool wear.

It is often necessary to retract the tool from the cutting surface for a plurality of reasons. The presently known automatically and manually adjustable tool block assemblies are not adaptable for combined cutting tool adjustment and retraction of the cutting tool.

SUMMARY OF THE INVENTION

The present invention provides an improved adjustable tool block assembly for boring, turning, facing machines or the like.

The improved structure comprises a housing having an axial bore provided with a bearing surface to receive a linear and radial bearing, which rotatably and axially supports a rotatable sleeve having eccentric inner and outer diameters. The eccentric sleeve is supported on a linear and radial bushing, which rotatably retains the boring bar assembly along a center line parallel with the axial bore of the housing so that upon rotation of the intermediate eccentric sleeve a radial displacement of the boring bar takes place relative to the central axis of the bore of the tool block. Means are further provided to manually axially adjust the boring bar in relation to the workpiece by means of a rotatable nut. This nut is positioned to be in abutment with a collar or flange provided on the eccentric sleeve and is always normally locked in place so that, even if the nut is tightened against this flange and the eccentric sleeve is rotated in one direction, the axial adjustment of the boring bar will not be affected. When the eccentric sleeve is rotated in another direction, it will not cause the axial adjustment nut to rotate, so that only radial adjustment of the boring bar is obtained to thereby retract the boring bar for repositioning of the workpiece. This is accomplished quickly and effectively by the use of a reversible motor as an actuator to rotate the eccentric sleeve in either direction as required.

Further novel features and distinct advantages of the present invention will become apparent, and others will be particularly pointed out in the following detailed description of a preferred embodiment of the invention, in which like reference characters refer to like parts throughout the several views.

BRIEF DESCRIPTION OF THE DRAWINGS

The accompanying drawings illustrate a preferred embodiment of the invention in detail and in which:

FIG. 1 is a longitudinal cross section through the present novel tool block assembly;

FIG. 2 is a transverse cross section of the tool block assembly shown in FIG. 1 as seen along line 2—2 thereof;

FIG. 3 is another cross section through the tool block assembly shown in FIG. 1 as seen along line 3—3 thereof;

FIG. 4 is still a further cross section through the tool block assembly shown in FIG. 1 as seen along line 4—4 thereof; and FIG. 5 is a right hand end view of the tool block assembly showing the swing plate in full plan view.

DESCRIPTION OF THE PREFERRED EMBODIMENT

With reference to the drawings, FIG. 1 is an axial cross section of the present improved tool block assembly indicated generally at 10, which is comprised of a housing 12 which, although shown in the other figures as being of square cross section, may be of any other desired cross section, such as round, polygonal or the like.

The housing 12 is provided with an axial cylindrical bore 14 adapted to receive a bushing 16. A tubular sleeve 18 is received within the bushing 16 for rotation therein relative thereto by means of an anti-friction ball bushing 20 disposed between the bushing 16 and the sleeve 18. The rotatable sleeve 18, in turn, receives the shank end 22 of a boring bar holder or adapter 24, which is supported within the sleeve on a similar anti-friction ball bushing 26. Thus, the tubular sleeve 18 is rotatable within ball bushings 20 and 26 relative to the housing 12 and to the boring bar holder 24, the latter of which is axially slidable a limited amount relative to the sleeve 18 for a purpose to be explained later on.

The rotatable sleeve 18 is provided with a flange 28 near one end which, on one side, is provided with a tapered surface 29 for matching engagement with a tapered locating surface 17 provided on the end of the bushing 16. The end of the sleeve 18 adjacent the flange 28 receives a gear 30 mounted to permit rotation of the sleeve 18.

Referring to FIG. 2, the gear 30 is disposed within an adapter housing 13 attached to one end of the housing 12 in axial alignment therewith by means of screws 32. The adapter housing 13 has an axial bore 34 of larger diameter than the main housing bore 14 to accomodate the gear 30. Still referring to FIG. 2, the gear 30 is adapted to mesh with a worm gear 36 disposed at an axis normal to the axis of the gear 30. The worm gear 36 is secured to a shaft 38 intermediate its ends, which extends vertically through the adapter housing 13 within the bore 40 and intersects a portion of the bore 34. The worm gear shaft 38 is retained for rotation within bushings 42 and 44 disposed on opposite sides of the worm gear 36. Each of the bushings 42 and 44 is provided with an axially extending surface slot 46. The slots 46 are inclined in opposite directions relative to each other and each is adapted to receive a set screw 48 by which the bushings are retained against rotation. The worm gear 36 is clamped in position between the bushings 42 and 44 by means of a plug 50 at the lower end of the bore 40 and a head portion 52 of the shaft 38 outwardly of the housing 13, which provides a shoulder 54 for abutment against the upper surface of the housing 13. Thus, in assembly, when the lower plug 50 is tightened within the bore 40, the bushings 42—44 prevent any axial movement of the worm gear 36 along the shaft 38 due to thrust loads upon operation of the gear mechanism since the bushings upon occurrence of thrust load in any direction will be further tightened due to the wedge-like arrangement between the slots 46 and the set screws 48.

The head portion 52 of the worm shaft 38 is secured by means of a key assembly 56, or the like, to the end of an output shaft 58 of an electric motor 60, which is mounted by means of a mounting plate 62 and spacer 64 to the top of the main housing 12 in an offset position relative to the central axis "X" of the tool block 10. The motor 60 is preferably of the reversible type, so that upon energization of the motor worm gear 36, the gear 30 and thus the sleeve 18 can be rotated in either direction.

Referring to FIG. 3, the other end of the rotatable sleeve 18 is provided with oppositely disposed lateral slots 66, which are adapted to receive correspondingly opposed axially extending tongues 68, extending from the rear surface of an adjusting plate 70 which can best be seen in FIG. 1, is piloted at 72 in the front end of the bushing 16 and is supported for rotation with the sleeve 18 on the ball bushing 26. Still referring to FIG. 1 the rear surface 74 of the adjusting plate, in assembly, is adapted to abut squarely against the front surface 76 of the housing 12 so as to maintain the axis "X" of the boring bar holder at all times in square relationship relative to the surface 76.

Still referring to FIG. 1 the outer diameter 19 of the sleeve 18, in relation to the inner diameter 21, is disposed on an axis "Z," which is slightly offset from the axis "X" but parallel thereto so as to provide an eccentric relationship which, when the sleeve 18 has been rotated by means of the gear arrangement 30–36, causes the boring bar holder 24 to be displaced parallel around the axis "X" causing radial displacement and thus relative advancement or retraction of the cutting tool (not shown) from the cutting surface of the workpiece (not shown).

The front end of the boring bar holder 24 outwardly of the housing 12 is provided with a flange portion 78 and an axial cylindrical blind bore 80, which is adapted to receive the shank 82 of a boring bar, indicated at 84. The boring bar 84, as is known, carries a cutting tool (not shown) at its other end for cutting operations on a workpiece (not shown). The boring bar flange 78 is preferably provided with a threaded radial bore 86 for the receipt of a set screw 88 to lock the boring bar 84 to the boring bar holder.

Thus, the means for locking the boring bar 84 to the holder is entirely independent of the means for providing radial adjustment of the cutting tool. Once the boring bar has been mounted in the proper rotated position, adjustment of the eccentric sleeve 18 to effect radial adjustment of the cutting tool to compensate for wear or to retract the tool from the workpiece will not disturb the rotational positioning of the cutting tool.

The boring bar holder 24 is provided adjacent the rear surface 79 of the flange 78 with a threaded section 90, which is adapted to receive an adjusting nut 92. The adjusting nut 92 has a flat rear surface 94, which, in one adjusted position of the nut is adapted to squarely abut against the front surface 75 of the adjusting plate 70. Both of these surfaces are accurately machined so as to assure continuous flat abutment with each other in square relationship to the axis "X" of the tool block. The adjusting nut 92 is provided radially with apertures 96 to accommodate the insertion of an appropriate wrench for rotation of the nut and is likewise provided with a threaded radial aperture 98 for the insertion of a set screw 100 to lock the nut in the adjusted position and against inadvertent rotation. It will be clear from the foregoing that, upon rotation of the nut 92 against the adjusting plate 70, the boring bar holder is moved outwardly of the housing 12 for axial adjustment of the cutting tool (not shown) relative to the workpiece (not shown), particularly to accommodate wear of the cutting tool. Again axial adjustment of the cutting tool is entirely independent of rotational and radial adjustment of the tool.

With particular reference to FIG. 4, the other end of the shank portion 22 of the boring bar holder 24, which extends into the adapter housing 13, is provided with a lateral slot 102 which is adapted to receive a matching key 104 provided laterally at the inner end of a driving head 106, which is secured to the end of the boring bar holder by a pair of screws 108. The driving head 106, due to its connection with the boring bar holder 24, is adapted to absorb rotational torque and shock loads exerted by the boring bar holder 24 during a machining operation, as will be explained further on, and is also adapted to compensate for axial adjustment of the boring bar holder, as will be explained.

As can best be seen in FIG. 1 the driving head 106 is slidably supported within an aperture 110 in the cover plate 112, which is suitably attached as, for instance, by screws 114 (FIG. 5) to the open end of the adapter housing 13. The interface between the aperture 110 and the driving head 106 is preferably sealed by means of a sealing ring 116 to prevent the entrance of moisture or foreign matter into the housings 12 and 13. The inner lateral surface 118 of the driving head 106 is provided with a plurality of recesses 120 (FIG. 4) circumferentially extending in equally spaced relationship around the key portion 104. The recesses 120 each receive a compression spring 122, which, in assembly, are adapted to abut against the back face 124 (FIG. 1) of a thrust ring 126 supported around the key-and-slot connection 102–104 between the boring bar holder 24 and the driving head 106. The thrust ring 126 is provided with a row of balls 128 which, in assembly, abut against the end face of the eccentric sleeve 18. As will be noted from FIG. 1, the plurality of springs 122 resiliently retain the balls 128 of the thrust ring 126 against the end face of the sleeve 18 to provide a resilient thrust and shock load absorbing connection between the sleeve 18 and the driving head 106.

With further particular reference to FIGS. 1 and 5, the outer lateral surface 107 of the driving head 106 is machined flat to provide a square abutment surface for a swing plate 130. As seen in FIGS. 1 and 5, the swing plate 130 is piloted in the driving head by means of a pair of spaced dowels 132-134 and is secured to the driving head by screws 136 (FIG. 5). As further seen in FIG. 5, the lower end of the swing plate 130 is shaped to form a yoke providing a central recess 138 between opposite arms 140 and 142. The recess 138 is adapted to receive the outer end of a dowel 144, which is secured in the lower end of the adapter housing 13 by extending through an aperture 146 in the cover plate 112. As seen in FIG. 5, the yoke arms 140-142 of the swing plate 130 are provided with transverse threaded apertures 148–150, which are centrally aligned in relation to the axis of the dowel 144 and which are adapted to each adjustably receive a set screw 152 for adjustable abutment against the radial surface of the dowel 144, and which will be normally locked in place by lock screws 154.

It will be noted that the swing plate 130 is rigidly attached to the driving head 106 to form a unitary assembly. Normally, the driving head and swing plate assembly is prevented from rotation relative to or with the boring bar holder 24 by the locking engagement of the set screws 152 with the dowel 144. However, limited necessary radial movement of the driving head and swing plate in either angular direction is permitted upon radial adjustment of the boring bar holder by loosening of the respective set screw 152 and relocking of the set screws after adjustment, as will be explained.

As seen in FIG. 1, and as described in the foregoing, the boring bar 24 and driving head 106 and the swing plate 130 form a unitary assembly, and it will be noted that a predetermined axial clearance "C" is provided between the boring bar flange 78 and nut 92 or, respectively, between the swing plate 130 and the cover plate 112, which defines the total axial adjustment for the boring bar holder in or out of the housing 12 to advance the boring bar 84 towards the workpiece or, respectively, retract it from the workpiece.

Axial adjustment of the boring bar holder 24 is as follows: as mentioned before, the interfaces 75 and 94 between the adjusting plate 70 and the nut 92 are accurately machined flat and the nut 92, in assembly, is normally locked against rotation by the set screw 100. To axially adjust the boring bar holder 24 in one direction, the set screw 100 of the nut 92 is loosened and the nut 92 is rotated by means of an appropriate wrench against the adjusting plate 70. Since the adjusting plate can not move axially, the boring bar holder 24 is forced axially out of the housing for a distance corresponding to the axial clearance "C." The shank 22 of the boring bar holder is axially moved through the ball bearing 26 and pulls the driving head 106 against the springs 122 and the swing plate 130 against the cover plate 112. Thus, it will be understood that by infeeding of the boring bar 84 against the workpiece (not shown) the springs 122 and consequently the thrust ring 126 will be pre-loaded corresponding to the amount of axial infeed to thereby increase the thrust and shock absorbing capacity of the boring bar assembly during the cutting operation. Prior to operation, the nut 92 will then be locked again by tightening of the set screw 100. Any previous radial adjustment of the boring bar holder around the axis "X" will not be affected by the above axial adjustment. To obtain axial adjustment of the boring bar holder 24 in the other direction, the set screw 100 of the nut 92 is loosened again and the nut is rotated away from the adjusting plate 70 which, causes the pre-loaded springs 122 to exert a force on the driving head 106 and thereby forcing the boring bar holder in the other direction.

To obtain radial adjustment the motor 60, which preferably is provided with a conventional speed reducing means (not shown) is started to rotate the worm gear 36 for rotation of the gear 30 by which the eccentric sleeve 18 is rotated around the axis "X" which causes a similar displacement of the boring bar holder 24, although, as previously, explained, both axis "X" and "Z" will remain constantly parallel so as to maintain axial alignment of the boring bar. During a machining operation, performed by the boring bar 84, the adjusted axial and radial position of the boring bar will be securely maintained. The bearing surfaces 19-21 are precision machined to close tolerances and held in parallel relation such that the ball bushings 20-26 will be preloaded upon assembly to provide sufficient rigidity in the tool block assembly and to further assist in maintaining the axis "X" and "Z" parallel. The torque introduced in operation by the cutting tool is transmitted to the housing assembly 12, 13 through the dowel 144 by means of the said driving head and swing plate assembly 106 and 130.

A primary feature of the present invention resides in the positive retraction of the boring bar 84 from the workpiece (not shown). Conventionally, retraction means for boring bar tool block assemblies had to be provided as additional mechanisms in addition to the normal features of axial and radial adjustment of the boring bar and generally required the mounting of actuator devices, such as clevises or the like, which increased the overall size and weight of the tool block.

Retraction of the boring bar 84 form its infeed position away from the workpiece is accomplished by reversing the rotation of the motor 60 by which the eccentric sleeve 18 is rotated in the opposite direction and thereby eliminating the previously obtained radial adjustment. The nut 92, in this phase of adjustment, is locked by the set screw 100 and remains in place against the adjusting plate 70. The cutting tool remains locked in the adjusted rotational position by the set screws 88. Since the adjusting plate 70 is connected to the sleeve 18 by means of the tongue and slot connection 66–68, rotational movement of the sleeve will be transfered to the adjusting plate 70 and, although the nut 92 is secured against the plate 70, the position of the nut will not be affected. As previously mentioned the axial retraction of the boring bar holder is obtained by the springs 122 which normally tend to urge the driving head 106 away from the thrust ring 126. Maximum retraction of the boring bar holder 24 is accomplished when the clearance "C" between the flange 78 and nut 92 is completely taken up to cause the rear surface 79 of the flange to abut against the nut 92. It is apparent that the use of the electric motor 60 permits the boring bar to be automatically controlled by a wide variety of electronic actuating and sensing devices.

It is also apparent from the foregoing description that with the provision of the present novel device an efficient and accurate means has been provided for universal adjustment of a boring bar of a tool block assembly by providing independent rotational radial and axial adjustment as well as positive retraction of the boring bar.

The present invention may be embodied in certain other forms without departing form the spirit and essential characteristics thereof, therefore, the present embodiment is to be considered in all respects as illustrative only and not restrictive, the scope of the invention being indicated by the appended claims rather than by the foregoing description.

I claim:

1. An adjustable boring bar holder for a tool block assembly comprising:
   a housing having an axial bore extending therethrough;
   an eccentric sleeve axially positioned for rotation within said bore;
   a boring bar holder axially positioned within said eccentric sleeve for limited axial movement relative thereto;
   a first bushing disposed between said housing bore and said sleeve and a second bushing disposed between said sleeve and said boring bar holder whereby said sleeve is rotatably movable with respect to said boring bar holder and said housing;
   a first adjusting means carried by said boring bar holder and operable to axially adjust said boring bar holder with respect to said housing;
   a second adjusting means independent of said first adjusting means connected with said sleeve for rotating said sleeve with respect to said housing and said boring bar holder to adjust said boring bar holder radially with respect to the axis of said housing bore;
   a third adjusting means independent of said first and said second adjusting means and connected with said boring bar holder to provide rotational adjustment and to lock said boring bar holder in a rotated adjusted position with respect to the axis of said housing bore; and said second adjusting means comprising a gear mechanism drivingly connected to said sleeve within said housing, and a motor means connected with said gear mechanism and selectively operable to drive said gear mechanism.

2. The adjustable boring bar holder as defined in claim 1, said boring bar holder comprising a longitudinal member having a flange portion at one end thereof outwardly of said housing, a driving head secured to the other end of longitudinal member and said resilient means being disposed between said driving head and said eccentric sleeve.

3. The adjustable boring bar holder as defined in claim 2, said sleeve having a flange, said first adjustment means comprising a nut threaded on said boring bar holder adjacent said flange portion to be disposed between said flange portion of said boring bar holder and said flange of said sleeve and normally in flat abutment with said flange of said sleeve providing an axial clearance between said flange portion of said boring bar holder and said nut which defines the limit of axial movement of said boring bar holder inwardly of said housing, said driving head at the other end of said boring bar holder being supported for limited sliding movement within an aperture in a cover of said housing and provided with a plate outwardly thereof for abutment against said cover to thereby limit the axial movement of said boring bar holder outwardly of said housing.

4. The boring bar holder as defined in claim 1 and in which said second adjusting means is adapted to selectively rotate said sleeve in either a clockwise or counterclockwise direction to adjust said boring bar holder radially outwardly and radially inwardly with respect to the axis of said housing bore.

5. The boring bar holder as defined in claim 1 and in which said motor means comprises an electric motor.

6. The boring bar holder as defined in claim 1 and in which said motor means comprises a reversible electric motor.

7. The boring bar holder as defined in claim 2 and including torque transferring means connected with said driving head, said torque transferring means comprising a swing plate mounted to said driving head exteriorly of said housing, said swing plate movable with said driving head about the axis of said driving head, and means rotationally adjustably mounting said swing plate to said housing whereby torque as produced by said driving head is transferred by said swing plate to said housing.

* * * * *